United States Patent
Leblans et al.

(10) Patent No.: US 7,199,379 B2
(45) Date of Patent: *Apr. 3, 2007

(54) BINDERLESS STORAGE PHOSPHOR SCREEN

(75) Inventors: Paul Leblans, Kontich (BE); Toshio Takabayashi, Hamamatsu (JP)

(73) Assignee: Agfa-Gevaert, Mortsel (BE)

( * ) Notice: Subject to any disclaimer, the term of this patent is extended or adjusted under 35 U.S.C. 154(b) by 335 days.

This patent is subject to a terminal disclaimer.

(21) Appl. No.: 10/609,145

(22) Filed: Jun. 27, 2003

(65) Prior Publication Data

US 2004/0051438 A1  Mar. 18, 2004

Related U.S. Application Data

(60) Provisional application No. 60/394,489, filed on Jul. 9, 2002.

(30) Foreign Application Priority Data

Jun. 28, 2002 (EP) .................................. 02100763

(51) Int. Cl.
  *H05B 33/00* (2006.01)
(52) U.S. Cl. .................................................. 250/484.4
(58) Field of Classification Search ............. 250/484.4
  See application file for complete search history.

(56) References Cited

U.S. PATENT DOCUMENTS

| | | | | |
|---|---|---|---|---|
| 4,575,635 A | * | 3/1986 | Arakawa et al. | 250/484.4 |
| 4,621,196 A | * | 11/1986 | Arakawa | 250/483.1 |
| 4,741,993 A | * | 5/1988 | Kano et al. | 430/536 |
| 4,963,751 A | * | 10/1990 | Kano et al. | 250/484.4 |
| 5,032,732 A | | 7/1991 | Ito | 250/484.1 |
| 5,466,947 A | * | 11/1995 | Fleig et al. | 250/582 |
| 5,723,865 A | * | 3/1998 | Trissel et al. | 250/368 |
| 5,905,014 A | | 5/1999 | Van de Bergh | 430/139 |
| 6,228,286 B1 | | 5/2001 | Leblans et al. | 252/301.4 H |
| 2001/0030291 A1 | * | 10/2001 | Homme et al. | 250/483.1 |
| 2002/0162965 A1 | * | 11/2002 | Okada et al. | 250/370.11 |
| 2003/0034458 A1 | * | 2/2003 | Isoda et al. | 250/484.4 |
| 2004/0026632 A1 | * | 2/2004 | Struye et al. | 250/484.4 |
| 2004/0262537 A1 | * | 12/2004 | Leblans | 250/484.4 |

FOREIGN PATENT DOCUMENTS

| | | |
|---|---|---|
| DE | 3205693 | 8/1983 |
| DE | 43 43 319 | 6/1995 |
| JP | 2000346996 | 12/2000 |

* cited by examiner

*Primary Examiner*—Albert J. Gagliardi
*Assistant Examiner*—Djura Malevic
(74) *Attorney, Agent, or Firm*—Joseph T. Guy; Nexsen Pruet, LLC (57) ABSTRACT

An image storage screen or panel, suitable for use in applications related with computed radiography, has been disclosed, wherein said screen or panel comprises a binderless needle-shaped stimulable (storage) phosphor and a substrate, characterized in that said substrate has a surface roughness of less than 2 μm and a reflectivity of more than 80%.

46 Claims, 3 Drawing Sheets

1: Phosphor layer
2: Moisture-resistant layer (1-10 μm parylene layer)
3: Reflective mirror layer (ca. 1 μm)
4: Support layer 5 (2 mm thick)

Fig. 1

1: Phosphor layer
2: Moisture-resistant layer (1-10 µm parylene layer)
3: Reflective mirror layer (ca. 1 µm)
4: Support layer 5 (2 mm thick)

BINDERLESS STORAGE PHOSPHOR SCREEN

This application claims the benefit of US provisional application No. 60/394,489 filed Jul. 9, 2002.

FIELD OF THE INVENTION

The present invention relates to a solution with respect to stringent demands for image definition, without loss in speed, in computed radiography.

BACKGROUND OF THE INVENTION

In radiography it is important to have excellent image quality for the radiologist in order to make an accurate evaluation of a patient's condition. Important image quality aspects are image resolution and image signal-to-noise ratio (SNR).

For computed radiography (CR) SNR depends on a number of factors.

The number of X-ray quanta absorbed by the storage phosphor screen is important. SNR will be proportional to the square-root of the number of absorbed quanta.

The so-called fluorescence noise, however, is of primary importance as well. This noise contribution originates from the fact that the number of photostimulated light (PSL) quanta detected for an absorbed X-ray quantum is small. Since much of the PSL is lost in the detection process in CR, fluorescence noise has an important contribution to the SNR. Hence, it is important that the number of photons detected per absorbed X-ray quantum is as high as possible. This situation is most critical in mammography, where X-ray quanta are used with low energy. Softer X-rays will give rise to less PSL centres and, therefore, to less PSL photons per absorbed X-ray quantum than harder X-rays.

In CR, a large number of PSL centres is created by an absorbed X-ray quantum. However, not all PSL centres are stimulated in the read-out process, because of the limited time available for pixel stimulation and because of the limited laser power available.

Typically, only about 30% of the PSL centres is stimulated to give rise to a PSL photon. Since these photons are emitted and scattered in all directions, only 50% of the PSL photons escape from the storage phosphor screen at the detector side. Only a fraction of the PSL photons emitted at the top side of the storage phosphor screen is guided to the detector, which has a limited quantum efficiency itself. For that reason, the number of PSL photons detected per absorbed X-ray quantum is of the order of 1 to 5 and the fluorescence noise contribution is important in CR systems.

In addition, it is well-known that fine detail visualisation, i.e. high-resolution high-contrast images are required for many X-ray medical imaging systems and, more particularly, in mammography. In phosphor screens, light scattering by the phosphor particles and their grain boundaries results in loss of spatial resolution and contrast in the image.

The number of PSL centres that is stimulated in the read-out process can be increased by reflecting the stimulating light at the bottom of the phosphor layer, i.e. by having a reflecting substrate. In this case the fraction of PSL centres that is stimulated will be higher than 30%. A reflecting substrate will also reflect the PSL photons, thereby increasing the number that leaves the screen at the top side to a fraction higher than 50%. The combination of these effects may increase the number of PSL centres detected per absorbed X-ray quantum to a significant extent, thereby strongly improving the image SNR. However, having a reflecting substrate causes increased scattering in a powder screen as well. The stimulating light spot is broadened when it is reflected at the screen substrate and spatial resolution is diminished. In powder CR screens, therefore, a reflective substrate is seldom used as such. It may be used in combination with an anti-halation dye on top of it. The anti-halation dye absorbs the stimulation light, thereby preventing its reflection and maintaining high resolution. As a consequence of having the anti-halation dye on top of the reflective substrate, however, the sensitivity of the CR plate is not remarkably enhanced.

OBJECTS AND SUMMARY OF THE INVENTION

It is an object of the present invention to offer a screen or panel that allows efficient creation and detection of PSL light, without leading to reduced resolution, i.e., to offer a CR screen that simultaneously provides high sensitivity and good resolution in a CR system.

It is a further object of the present invention to offer a screen or panel for CR applications and, more in particular, for applications related with mammography.

The above-mentioned advantageous effects have been realized by providing a storage phosphor screen or panel having the specific features set out in claim 1. Specific features for preferred embodiments of the invention are set out in the dependent claims.

Further advantages and embodiments of the present invention will become apparent from the following description and drawings.

DETAILED DESCRIPTION OF THE INVENTION

As will become clear from the description and the examples hereinafter the object of the present invention has been achieved by providing a needle-shaped phosphor layer on top of the reflective substrate, more preferably a metal substrate and in a most preferred embodiment an aluminum substrate or layer acting as a mirror.

It is well known that needle-shaped crystals act, to a certain extent, as light guides, thereby reducing lateral spread of stimulation and emission light in the phosphor layer. Surprisingly, however, it was found that, by having a reflective layer having a certain degree of roughness, under the needle-shaped phosphor layer, an increased sensitivity of the CR system by a factor of 2 was attained without affecting its resolution (sharpness) at all.

According to the present invention an image storage screen or panel has been provided, wherein said screen or panel comprises a binderless needle-shaped stimulable phosphor and a substrate, characterized in that said substrate has a surface roughness of less than 2 µm and a reflectivity of more than 80%. In order to measure said reflectivity use can be made of the measurement technique with a reflectometer as described in ASTM D523, 1985, corresponding with DIN 67530 (01.82) and ISO 2813 (1978) wherein reflections are measured at values of the reflection angles of 20° and 60°. Measurement normally takes place at reflection angles of 20° in the case of high gloss and at 60° for moderate gloss as decreasing values are obtained at lower measurement angles. Measurements made at 10 different sites at the film surface provide ability to calculate average values and standard deviations therefrom and to express said reflectance in percentage figures.

It was not possible to derive surface glare characteristics from surface roughness data as optical theory for light interacting with smooth and rough surfaces tells that sinusoidal roughness differences of 0.01 µm reduce gloss by ca. 40% as has been set forth in Journal of Coatings Technology, Vol. 67 (851), p. 61, published December 1995.

It is clear that the "reflectance percentage" is closely related with "surface roughness". Said roughness, called "Rz" has to be determined as the arithmetic mean or average roughness depth value Rt of five different, but adjacent measuring area on the "rough" reflecting substrate; said value Rt being defined as the difference in height between the highest "top" and the lowest "valley" measured onto said substrate. A suitable instrument for such microscopically fine measurements is a "perthometer", by means of which the surface texture can be measured according to ANSI B46.1-1985 as published by The American Society of Mechanical Engineers.

The said image storage screen or panel of the present invention thus comprises a binderless needle-shaped stimulable phosphor and a reflecting substrate, characterized in that said substrate has a surface roughness of less than 2 µm, more preferably less than 1 µm, (but exceeding 0 µm), and a reflectivity of more than 80%, and, in a more preferred embodiment it has a reflectivity of at least 90%, and even more preferably at least 95%.

More preferred for use as a reflecting substrate of the screen or panel of the present invention is a metal substrate and, in a most preferred embodiment, the said metal substrate is an aluminum substrate, thereby forming a mirror.

The reflecting metal substrate of the stimulable phosphor screen or panel may form the only support layer, but is, in a preferred embodiment further composed of two layers in contact with each other, said layers being a layer of the polymeric type or an amorphous carbon type (a-C)layer and, in contact therewith, an aluminum layer. Reason for this is that presence of only one metal support layer absorbs X-rays to such an extent that use of a phototimer is no longer interesting in some dedicated applications as will be explained furtheron hereinafter.

Figure 1:
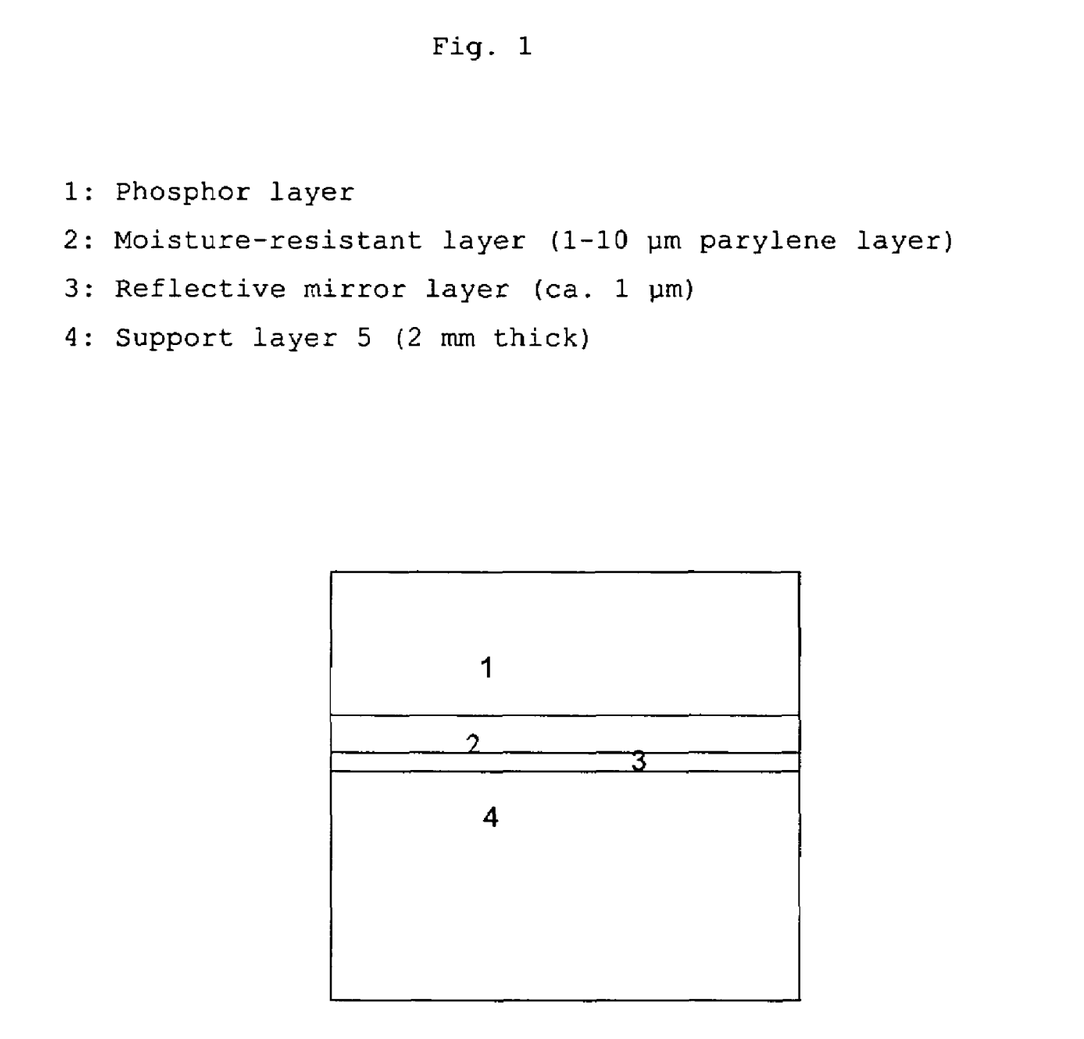
FIG. 1 shows a layer arrangement of the phosphor screen or panel with a phosphor layer on top (1), and between said phosphor layer and the amorphous carbon (a-C) substrate (4), a thin aluminum layer (3) in direct contact with the a-C substrate (4) and a moisture-impermeable parylene layer (2).

Thicknesses of both layers, the reflective mirror layer (3) and the support layer (4) are, as illustrated in FIG. 1, in the range from about 2 mm for the support layer (4) and 1 µm for the reflective mirror layer (3), acting as a mirror, not only for incident stimulation radiation light from the read-out laser, but also for the stimulated radiation emitted by the stimulable phosphor, after having been laser stimulated, in order to transform the stored energy, stored in the phosphor layer (1), into stimulated radiation. In FIG. 1 an intermediate layer is provided as moistureproof layer (2) inbetween reflective mirror (3) and phosphor layer (1).

The very thin reflective mirror preferably is an aluminum layer (having a thickness of about 1 µm) deposited onto an about 2 mm thick support layer (amorphous carbon—a-C layer —or a polymeric support layer), in the most common way, by means of the vapour deposition technique. Polymeric support films known in the art are, e.g., polyester film, polyvinylchloride, polycarbonate, syntactic polystyrene, etc. Preferred polymeric films are polyester ester film, e.g., polyethyleneterephthalate films, polyethylenenaphthalate films, etc. The thickness of the support auxiliary layer (4), in principle range from 1 µm to 500 µm. Instead of the cited polymeric film supports, it is however possible to make use of a fairly thin amorphous carbon film, e.g., 400 µm and laminate a 500 µm thick auxiliary film to it at the side away from the phosphor layer, as well as to use a thick amorphous carbon film, e.g., 2000 µm thick with a thin, e.g., 6 µm thick, polymeric film laminated to it. The relative thickness of amorphous carbon and polymeric film can be varied widely and is only directed by the required physical strength of the amorphous carbon during deposition of the phosphor layer and amorphous carbon and polymeric film can be varied widely and is only directed by the required physical strength of the amorphous carbon during deposition of the phosphor layer and the needed flexibility of the panel during use.

The screen or panel according to the present invention thus has a substrate, the surface roughness of which is less than 2 µm, and even more preferably less than 1 µm, when measured by means of a perth-o-meter as set forth hereinbefore. If an extremely low surface roughness is envisaged, high quality optical polishing of the metal layer, preferably aluminum, can be performed as has e.g. been described in U.S. Pat. No. 6,350,176, wherein precise optical polishing of typical bare aluminum proceeds up to a surface roughness of less than about 300 nm rms and preferably about 50 nm rms while maintaining a "surface figure accuracy" in terms of "surface figure error" of not more than one-fifteenth of wave peak-to-valley.

As described in U.S. Pat. No. 5,288,372 a method for changing a metal body has been provided, wherein as an undeniable advantage the said metal body surface is substantially uniformly roughened with a reproducible surface texture.

The lower its roughness, the better the aluminum layer is acting as a flat mirror, and the better the image definition for the captured image, present as stored energy to be stimulated, and the lower the loss in speed. Adding a specularly reflecting layer between the phosphor layer and the amorphous carbon layer thus enhances both image quality and speed of the screen or panel. Also in panel according to the present invention, addition of such a specularly reflecting auxiliary layer may be beneficial. When such a layer is added, it preferably reflects at least 80% of the light impinging on it in a specular way. More preferably said layer reflects 90% of the impinging light specularly. Such metal layers preferably have a thickness under 20 µm, preferably under 10 µm. When in a screen or panel according to the present invention, a specularly reflecting layer is present, it is preferred that the layer is a thin aluminum layer. Preferably said thin aluminum layer has a thickness of less than or equal to 10 µm, more preferably from about 0.2 up to 5 µm.

Since such a thin metal layer, preferably an Al layer, can be quite corrosion sensitive, it is further preferred that, when a specularly reflecting metal layer (3) is present in a screen or panel of the present invention, that this layer is covered with a barrier layer (2) that impedes water and/or moisture of reaching the relecting metal layer (3). Such a barrier layer (2) can, in principle, be any moistureproof barrier layer known in the art, but is preferably a layer of parylene. Most preferred polymers for use in the moistureproof layer and in a protective layer, in contact with the phosphor layer and farther from the support layer (4), of the screen or panel of the present invention, are chemical vacuum deposited poly-p-xylylene films. Such a poly-p-xylylene has repeating units in the range from 10 to 10000, wherein each repeating unit has an aromatic nuclear group, whether or not substituted. As a basic agent the commercially available di-p-xylylene composition sold by the Union Carbide Co. under the trademark "PARYLENE" is thus preferred. The preferred compositions for the barrier layer are the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation, moisture resistance being about the same as the moisture resistance of "PARYLENE C"). Most preferred polymers for use in the preparation of the layer A of a phosphor panel of this invention are poly(p-2-chloroxylylene), i.e. PARYLENE C film, poly(p-2,6-dichloroxylylene), i.e. PARYLENE D film and "PARYLENE HT" (a completely fluorine substituted version of PARYLENE N.

The advantageous effect of the parylene layers as moistureproof barrier layers in a screen or panel of the present invention is their temperature resistance: the temperature resistance of the parylene layers is such that they can withstand the temperature need for vacuum depositing the storage phosphor. Use of parylene layers in storage phosphor screens has been disclosed in e.g. EP-A's 1 286 362, 1 286 363, 1 286 364 and 1 286 365.

In the production of binderless phosphor screens by means of chemical vapour deposition in vacuum, the support on which the phosphor is deposited can be heated to a temperature of up to about 400° C. So the use of a thermostable support is necessary. Therefore, a polymeric support, though being composed of elements having a low atomic number is not the most suitable. Including an amorphous carbon film (4)in the support however provides opportunities to produce a binderless storage phosphor screen on a support with low X-ray absorption, even by vacuum deposition at fairly high temperature. Amorphous carbon films suitable for use in this invention are commercially available through, e.g., Tokay Carbon Co, LTD of Tokyo, Japan or Nisshinbo Industries, Inc of Tokyo, Japan, where they are termed "Glass-Like Carbon Film", or "Glassy Carbon".

In a binderless phosphor sceen or panel according to the present invention, the thickness of the amorphous carbon layer can range from 100 µm up to 3000 µm, a thickness between 500 µm and 2000 µm being preferred as a compromise between flexibility, strength and X-ray absorption. Such a low X-ray absorption moreover provides ability to make use of a so-called "phototimer", already mentioned hereinbefore. Said "phototimer" comprises a radiometer for measuring the radiation dose passing through the object (patient) and the radiographic imaging system and a connection to the source of penetrating radiation for switching the penetrating radiation source off as soon as a pre-set dose is reached. In systems using such a "phototimer" it is important that a well measurable dose reaches the radiometer in the phototimer, since when the dose reaching the phototimer is too low, small differences will cause large irreproducibility and uncertainty with respect to the switching off of the source of penetrating radiation. In a practical setting the amount of radiation that reaches the "phototimer" is determined by the absorption of penetrating radiation by the object, wherein the tube side of the cassette contains the supported storage phosphor screen or panel and the back side of the cassette. Otherwise the absorption of the supported storage phosphor screen or panel is determined by the phosphor that is used, the amount of phosphor and the support: as a higher absorption in the phosphor layer is advantageous for speed and image quality of the radiographic imaging system there is a need to increase the thickness (the absorption) of the phosphor layer and this can only be done when the total absorption of phosphor layer and support remains almost constant, so that increasing the thickness of the phosphor layer must be compensated by lowering the absorption of penetrating radiation in the support. Especially in radiographic techniques where penetrating radiation of low energy is required as e.g. in mammography and some dedicated non-destructive testing applications, the much too high contribution of the support to the absorption of the phosphor screen or panel should be lowered. Lowering of the absorption of penetrating radiation by the support by lowering its thickness may however lay burden on the desired high mechanical strength of the screen or panel, its non-desired brittleness and, in case of vacuum deposition of the phosphor onto the said support, ability to withstand the high temperatures needed during vapour deposition. Amorphous carbon has therefore been selected as a particularly suitable support combining all advantages for use in a screen or panel of a stimulable phosphor, more particularly with respect to mechanical strength and heat resistance.

As an alternative hard thin films, such as tetrahedral amorphous carbon (ta-C) films, have interesting and useful properties, such as extreme hardness (about 70 Gpa), thermal stability, high electrical resistivity, smooth surface and low friction, and transparency in wide spectral range because of the high $sp^3$ fraction of carbon atoms (up to 87%) in the film. However, the high internal stress in the films can limit their applications, especially when it is desired to deposit a relatively thick film, as the film may flake away from the substrate. In order to reduce the internal stress of ta-C films, and in an attempt to improve adhesion of thick films of this type, different modifications have been made, as recently disclosed in U.S. Pat. No. 6,387,443 wherein amorphous silicon-carbon alloys (a-$Si_{1-x}C_x$). In a particularly preferred embodiment of that invention the preparation method comprises depositing a layer of a composite film of carbon and silicon, suitably using a target which contains at least 40% carbon, the remainder being substantially silicon. The thus obtained composite Si—C film moreover provides suitable applications in the semiconductor field. As stress levels are reduced if compared with pure ta-C films, deposition at greater thicknesses than pure ta-C films are available with retainment of an acceptable hardness.

Figure 3:
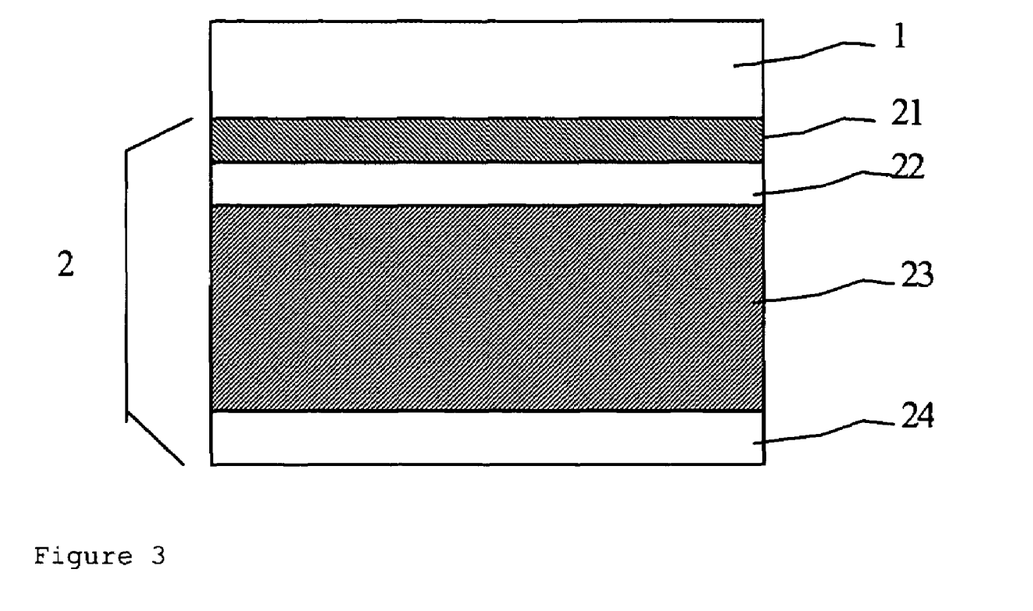
FIG. 3 shows a layer arrangement of the phosphor screen or panel with a phosphor layer on top (1), and between said phosphor layer and the amorphous carbon (a-C) substrate (23), a thin aluminum layer (22) in direct contact with the a-C substrate (23) and a moisture-impermeable parylene layer (21), wherein the a-C layer (23) is in direct contact with a (polymeric) support layer (24) at the side opposite to the phosphor layer (1) side.

According to the present invention a screen or panel has thus been provided wherein said substrate is an amorphous carbon layer (23) as part of the support (2) of the needle shaped stimulable phosphor layer (1), wherein said amorphous carbon layer (23) has been overcoated with a reflecting layer (22) as has more particularly been illustrated in FIG. 3. Furtheron a screen or panel (as in FIG. 3) has been provided, wherein said reflecting layer is a metal layer, and more preferably, wherein said reflecting layer is an aluminum layer (22). Since such a thin metal layer can be quite corrosion sensitive it is preferred that, when a specularly reflecting aluminum layer is present in a panel or screen of the present invention, that this layer is covered with a barrier layer (further auxiliary layer (21)) that impedes water and/or moisture of reaching the relecting auxiliary layer. Such a barrier layer can be any moisture barrier layer known in the art, but is preferably a layer of parylene. Most preferred polymers for use in the protective layer of the screen or panel of the present invention, thereby protecting the phosphor layer (1) are vacuum deposited: preferred are chemical vacuum deposited poly-p-xylylene films already discussed hereinbefore.

According to the present invention a screen or panel has been provided, wherein the moisture-repellent or moisture-proof layers are present, not only inbetween the reflective aluminum layer coated onto an a-C layer substrate and the said phosphor layer, but also as a protective layer onto the said phosphor layer and farther from the said a-C substrate.

Preferably the thickness of said parylene layer is in the range from 0.5 up to 15 µm, and, in a more preferred embodiment in the range from 1 up to 10 µm.

"Parylene" is a polymeric material having excellent resistance to humidity. The layer may however, when used in an automatic panel handling apparatus, quite easily be physically damaged or simply worn off, so that during use the humidity resistance diminishes, thereby gradually loosing moisture resistance during use. Application of a further protective layer on top of the outermost parylene layer however is recommended in order to prevent the physical wear of the panel so that the useful life of the panel could be extended.

Thus a panel according to the present invention, in a more preferred embodiment comprises a protective coating divided into at least two layers, one inner layer, being closest to the phosphor layer and another outermost layer farther away from the phosphor layer wherein the inner layer is the parylene layer.

As an outermost protective layer in the phosphor screen of the present invention any polymeric layer known in the art of applying a protective layer to a phosphor screen or panel may be used. This layer may be coated onto the phosphor panel by directly applying thereto a coating solution containing a film-forming organic, solvent-soluble polymer such as nitrocellulose, ethyl cellulose or cellulose acetate or poly(meth)acrylic resin and removing the solvent by evaporation. According to another technique a clear, thin, tough, flexible, dimensionally stable polyamide film is bonded to the phosphor panel as described e.g. EP-A 0 392 474.

In a preferred embodiment, the outermost protective layer covering the parylene layer most remote from the support, and in contact therewith, is produced with a radiation-curable composition, thus providing, in another embodiment according to the present invention, a radiation cured polymeric layer. Use of a radiation curable coating as a protective top layer in a X-ray conversion screen has been described e.g. in EP-A 0 209 358 and in U.S. Pat. Nos. 4,893,021 and 6,120,902. So e.g. the protective layer comprises a UV cured resin composition formed by monomers and/or prepolymers that are polymerized by free-radical polymerisation with the aid of a photoinitiator. The monomeric products are preferably solvents for the prepolymers used.

Very useful radiation curable compositions for forming an outermost protective coating upon the moisture repellent parylene layer of the screen or panel according to the present invention contain, as primary components, (1) a cross-linkable prepolymer or oligomer or a mixture of cross-linkable prepolymers or oligomers,
(2) a reactive diluent monomer or mixture of reactive diluent monomers, and
(3) in the case of a UV curable formulation a photoinitiator.

The usual amounts of these primary components calculated on the total coating composition are in the range from 30–100% by weight for the prepolymer, 10–70% by weight for the reactive diluent and 0–10% by weight for the photoinitiator. Optionally minor amounts (e.g. 5% by weight) of non-reactive organic solvent for the prepolymer may be present.

Although any radiation curable composition known in the art, as e.g., the composition disclosed in EP-A 0 510 753 can be used, it may be very beneficial to have a coating solution containing fluorinated compounds so that the finished protective layer comprises at least 1% mole per mole of fluorinated moieties. Preferably the coating composition is so that the finished protective layer comprises between 5% and 50% (mole per mole) of fluorinated moieties. The fluorinated moieties can be present either in said cross-linkable prepolymer or oligomer or in said reactive diluent monomer or in both. Preferably the fluorinated moieties are added by using as diluent monomer a fluorinated monomer or by adding a fluorinated monomer to the mixture of diluent monomers. Very useful fluorinated monomers for adding fluorinated moieties to the protective layer of a storage panel of this invention are, e.g., $C_8F_{17}CH_2CH_2N(CH_3)$ $COCH=CH_2$, $C_8F_{17}CH_2CH_2OCOCH=CH_2$, $C_6F_{13}C_2H_{45}COCH=CH_2$, $C_7F_{15}CH_2OCOC(CH_3)=CH_2$, $C_8F_{17}SO_2N(C_2H_5)C_2H_4NHCOCH=CH_2$, $(CF_3)_2CF(CF_2)_8C_2H_2SCOC(CH_3)=CH_2$, $C_8F_{17}SO_2N(CH_3)$ $C_2H_4COOCH=CH_2$, $C_6F_{13}CH_2CH_2OOCC(=CH_2)COOCH_2CH_2C_6F_{13}$, $C_7F_{15}CH_2OOCCH=CHCOOCH_2C_7F_{15}$, $C_6F_{13}C_2H_4N(CH_2CH_2OH)COCO=CH_2$, $C_7F_{15}CON(C_2H_5)C_3H_6SCOC(CH_3)=CH_2$, $C_6F_{13}CH_2NHCOCO=CH_2$, $C_8F_{17}CH_2CH_2OCH=CH_2$, $(CF_3)_2CF(CF_2)_6CH_2CH(OH)CH_2OCOCH=CH_2$, $(CH_3)_2CFOC_2F_4OCOCH=CH_2$, $C_8F_{17}C_2H_4SO_2N(C_3H_7)C_2H_4OCOCH=CH_2$, $C_7F_{15}C_2H_4CONHC_4H_8OCOCH=CH_2$ $C_7F_{15}COOCH_2C(CH_3)_2CH_2OCOC(CH_3)=CH_2$, $C_8F_{17}SO_2N(C_2H_5)C_4H_8OCOCH=CH_2$, $(C_3F_7)_2C_6H_3SO_2N(CH_3)C_2H_4OCOCH=CH_2$, $C_8F_{17}CF=CHCH_2N(CH_3)C_2H_4OCOCH=CH_2$, $C_8F_{17}SO_2N(C_2H_5)C_2H_4NHCOCH=CH_2$, $C_8F_{17}SO_2N(CH_3)C_2H_4OCOCH=CH_2$, $C_8F_{17}SO_2N(C_2H_5)C_2H_4OCOC(CH_3)=CH_2$, $C_8F_{17}SO_2N(CH_3)CH_2C_6H_4CH=CH_2$, $C_8F_{17}C_2H_4SO_2N(C_3H_7)C_2H_4OCOCH=CH_2$, $C_8F_{17}SO_2N(C_2H_5)C_4H_8OCOCH=CH_2$, and $(C_3F_7)_2C_6H_3SO_2N(CH_3)C_2H_4OCOCH=CH_2$ and combinations thereof.

As set forth above, the fluorinated monomers may be used as diluent monomer(s) or may be used in combination with non-fluorinated diluent moieties. Very useful non-fluorinated diluent monomers for use in this invention are: methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, tetrahydrofurfurylmethacrylate and the like.

When the fluorinated moieties are present in the cross-linkable prepolymer or oligomer then preferably a mixture of fluorinated and non-fluorinated prepolymers is used. Examples of fluorinated prepolymers—useful in order to bring fluorinated moieties in the protective layer of this invention—are, e.g., fluorinated polyester acrylates wherein the polyester includes fluorinated moieties brought in the polyester via fluorinated di- or poly-ols or via fluorinated di- or poly-carboxylic acid. Very suitable fluorinated diols and polyesters derived therefrom are those described in, e.g., U.S. Pat. Nos. 4,957,986; 5,004,790 and 5,109,103. Examples of suitable diols are, e.g., 3,3,4,4,5,5,6,6-octafluoro-octan-1,8-diol, or 2,2,3,3-tetrafluoro-1,4-butane-diol, and most suitable diols are diols with the formula $HOCH_2(CF_2)_nCH_2OH$, wherein $2 \leq n \leq 10$. Suitable fluorinated poly- or diacids are those corresponding to the formula $HOOC(CF_2)_nCOOH$ or the methylesters thereof. Also terephthalic acid carrying $-O-(CH_2)_{10}-(CF_2)_9-CF_3$ as a side group can be used in order to produce a fluorinated prepolymer suitable for use in a screen of the present invention. In both cases the polyester can then be functionalized with acrylates as described in EP-A-207 257. It is also possible to introduce the fluorinated moieties via the acrylation step; when using polyesters as described in, e.g., EP-A 0 207 257, these are functionalized by using fluorinated acrylates, as those shown above.

When fluorinated prepolymers or oligomers are used, these can be mixed with non-fluorinated prepolymers or oligomers. Examples of suitable non-fluorinated prepolymers for use in a radiation-curable composition applied according to the present invention are the following unsaturated polyesters, e.g. polyester acrylates; urethane modified unsaturated polyesters, e.g. urethane-polyester acrylates. Liquid polyesters having an acrylic group as a terminal group, e.g. saturated co-polyesters which have been provided with acryl-type end groups, have been described in the published EP-A 0 207 257.

When radiation-curing is carried out with ultraviolet radiation (UV), a photoinitiator is present in the coating composition in order to serve as a catalyst thereby initiating the polymerisation of the monomers and their optional cross-linking with the pre-polymers, resulting in curing of the coated protective layer composition. A photosensitizer for accelerating the effect of the photoinitiator may be present.

Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethyl-benzoate; acetophenone series compounds such as acetophenone, trichloroacetophenone, 1,1-dichloroacetophenone, 2,2-diethoxyaceto-phenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2-methyl-1-phenyl-propan-1-one which product is marketed by E. Merck, Darmstadt, Germany under the trade name DRACUT 1173.

The above mentioned photopolymerisation initiators may be used alone or as a mixture of two or more.

Examples of suitable photosensitizers are particular aromatic amino compounds as described e.g. in GB-Patents 1,314,556 and 1,486,911, in U.S. Pat. No. 4,255,513 and merocyanine and carbostyryl compounds as described in U.S. Pat. No. 4,282,309. To the radiation-curable coating composition there may be added a storage stabilizer, a colourant, and other additives, and then dissolved or dispersed therein in order to prepare the coating liquid for the protective layer. In addition to these primary components additives may be present, as e.g. surfactants, solid lubricants, waxes, de-foamers and plasticizers, without however being limited thereto.

It is clear that it is the purpose of an outermost layer, coated upon the moisture repellent parylene layer most remote from the aluminum coated amorphous carbon substrate of the panel, to provide the said phosphor panel of the present invention with good abrasion properties. The abrasion properties of such an outermost layer are tested in a Taber abrasion test using a TELEDYNE TABER 5130 Abraser (trade name of Taber Industries, N.Y., USA) with rotation elements CALIBRASE CS10F, sandpaper P220, and load of 250 g on each element. Losses in thickness of such an outermost protective layer can be measured after 500 cycles. Preferably the said outermost layer looses, in the test as described above, at most 25% of its thickness. More preferably the layer looses in the test above at most 20% of its thickness and, even most preferably, at most 15%.

If desired or required, the outermost layer of the present invention may include spacing particles in favour of improved transportability and adjusted electrostatic properties. Suitable spacing agents in form of friction reducing polymer beads are selected from the group consisting of solid polystyrene, solid polyalkylene and a solid organic fluorinated polymer. Preferably the spacing agents are beads incorporating fluorinated moieties. Such beads have been described e.g. in U.S. Pat. No. 4,059,768.

In the construction of the scanning apparatus used for reading storage phosphor screens the trend is towards more and more compact apparatus, so that the distance between the (moving) storage phosphor screen and mechanical (moving) parts of the scanner can become very low (e.g. inbetween 10–100 µm). When then a storage phosphor screen with an outermost protective layer coated upon the moisture repellent parylene layer most remote from the substrate has protruding beads it is important that the beads do not touch mechanical parts of the scanner and that this is true even when the storage panel shows some wobble during transport in the scanner. Therefore beads used as spacing particles in a storage phosphor screen of the present invention preferably have a median volume diameter, $d_{v50}$, so that 5 µm $\leq d_{v50} \leq$ 25 µm and a median numeric diameter, $d_{n50}$, so that $1 \leq d_{v50}/d_{n50} \leq 1.20$. Further the beads are preferably adapted to the thickness, t, of the outermost protective layer on the storage panel of the present invention so that said polymeric beads have a median volume diameter, $d_{v50}$, wherein $1.25 \leq d_{v50}/t \leq 4.0$.

In favour of flatness of the panel having as a protective layer the single parylene layer or the double-layer with the parylene layer, overcoated with an outermost layer, for the panel of the present invention it is recommended to polish the phosphor layer deposited from the vapour phase to a predetermined even layer thickness before coating a protective layer thereupon by the method as described in WO 02/20868.

The phosphor layer in a flat screen or panel of the present invention may in principle comprise any phosphor known in the art, and it may be a prompt emitting phosphor as well as a photostimulable phosphor and, furthereon, the phosphor layer in a panel according to the present invention may be a layer including a phosphor mixed in a polymer binder as well as a binderless phosphor layer. It is however preferred that the phosphor layer in the panel according to the present invention is sandwiched between two moisture repellent layers, preferably both being composed of parylene as set forth hereinbefore. It is advantageous that the stimulable phosphor layer is "surrounded" by a moisture-proof parylene "package" as in the vicinity of the edges, both parylene layers, contacting each other, indeed provide a moisture-proof construction.

The screen or the panel of the present invention can also have reinforced edges as described in, e.g., U.S. Pat. No. 5,334,842 and U.S. Pat. No. 5,340,661.

The surface of the phosphor layer (1) in a panel or screen of the present invention can be made smaller than the surface of the support (2) so that the phosphor layer does not reach the edges of the support. Such a screen has been disclosed in, e.g., EP-A 1 286 363.

Within the scope of the present invention however, a phosphor panel having a protective layer according to the present invention comprises a hygroscopic phosphor having storage capacity, thus being a photostimulable phosphor, most preferably having a binderless phosphor layer. Among the binderless phosphor layers a phosphor layer comprising needle-shaped phosphor particles separated by voids, of a CsX:Eu phosphor, wherein X represents a halide selected from the group consisting of Br and Cl, is most preferred as a phosphor layer in the present invention. Such phosphors have been described in EP-A 1 113 458 and the method to prepare them has been described e.g. in WO01/3156 and the corresponding EP-A 1 203 394. A europium activated cesium bromide phosphor giving an increased stimulated emission amount, and which is also suitable for use in the screen or panel according to the present invention, is represented by the formula CsBr:xEu wherein $0<x\leq0.2$, in which a relationship between an emission intensity $I_E$ of $Eu^{2+}$ and a coloring intensity $I_F$ at F ($Br^-$) center satisfies the condition of $0.2 \leq I_E X I_F$, and/or in which a ratio of $Eu^{2+}$ to $Eu^{3+}$ contained in the phosphor in terms of emission intensity satisfies the condition of $5 \times 10^{-5} \leq Eu^{3+}/Eu^{2+} \leq 0.1$ as has been described in US-Application No. 2002/0041977.

A screen or panel according to the present invention thus preferably comprises a stimulable phosphor layer having CsX:Eu phosphor as a stimulable or storage phosphor, X being selected from the group consisting of Br and Cl.

So in one embodiment, as described in EP-Application No. 02100295, filed Mar. 26, 2002, needle-shaped CsBr:$Eu^{2+}$ storage phosphor particles in form of a cylinder are preferred, said particles having an average cross-section diameter in the range from 1 to 30 µm (more preferably in the range from 2 to 15 µm, and an average length, measured along the casing of said cylinder, in the range from 100 µm up to 1000 µm, more preferably from 100 µm up to 500 µm. Needle-shaped CsBr:$Eu^{2+}$ storage phosphor particles having an average aspect ratio of length to cross-section diameter in the range from 5 to 200 (and even in the narrower range from 20 to 100) are most preferred. Variation coefficients upon average cross-section diameter and average casing length in the range from 0.05 up to 0.30 (and even in the range from 0.05 up to 0.20) for the needle-shaped CsBr:$Eu^{2+}$ storage phosphor particles, are representative for the homogeneity of the needle-shaped phosphors.

The radiation image storage phosphor screen or panel emitting radiation after stimulation of phosphor particles having stored energy from X-rays having impinged upon said screen or panel in a most preferred embodiment thus comprises:

an amorphous carbon substrate covered with a planar aluminum layer serving as a planar mirror;
a multiplicity of cylindrical needle-shaped phosphors extending onto the surface of the aluminum layer, said phosphors being the needle-shaped CsBr:$Eu^{2+}$ storage phosphor particles in form of a cylinder, as mentioned above;
a moisture repellent layer at both sides of the phosphor layer; and, optionally,
an outermost protective layer against abrasion due to frequent use of said panel in computed radiographic applications.

In a further embodiment the radiation image storage phosphor screen according to the present invention, has a binderless phosphor with needle-shaped phosphors having cylindrical walls, wherein a light reflective coating is disposed along the walls of said cylinders, arranged in order to reflect, at least partially, radiation emitted by said phosphors after having performed stimulation thereupon. Furthermore the radiation image storage phosphor plate or panel comprises one or more dyes.

Presence of the dye is not restricted to whatever a layer in the layer arrangement presented hereinbefore, but it is preferred that at least dye in nanocrystalline form is present in at least one layer. Said at least one nanocrystalline dye compound may further comprise colloidal silica. More preferably the said dye is a compound, being a copper complex of a cyanine dye and, even most preferably said dye compound is a Cu-sulphonated phthalocyanine (βCu-phthalocyanine). The stimulable phosphor particles, coloured with a dye providing ability to be added from an aqueous-free medium, thereby show an excellent light-stability, which, as a consequence gives an excellent image resolution. Coating amounts of said dyes are in the range from 1 µg/m² up to 1000 µg/m².

As has already been taught or suggested before the flat screen or panel of the present invention should have a strong protective layer in order to provide ability for easy transport through a scanning module without causing jamming.

The layer arrangement with a binderless photostimulable phosphor screen, preferably vapour deposited alkali metal halide phosphor (preferably the needle-shaped CsX:Eu phosphor, wherein X represents a halide selected from the group consisting of Br and Cl) onto the substrate, moreover provided with at least one nanocrystalline dye compound present in at least one layer on the said substrate, coated on an aluminum covered amorphous carbon substrate moreover is in contact with a Fibre Optic Plate (FOP).

When on such a phosphor layer with needle shaped phosphor crystals, separated by voids, a (water repellent) layer (thus showing very low water permeability) is deposited, it is preferred that this layer is a chemical vacuum deposited parylene layer, while such a layer not only covers the surface of the needle crystals, but also covers the voids between the needles thus protecting the edges of the phosphor needles thoroughly against humidity.

A phosphor panel of the present invention may also comprise edge reinforcements as the ones described in e.g. U.S. Pat. Nos. 5,334,842 and 5,340,661.

In a particular embodiment of the present invention the surface of the phosphor layer is smaller than the surface of the support so that the phosphor layer does not reach the edges of the support. Thus a panel with a support having a surface larger than the main surface of the phosphor layer, so that the phosphor layer leaves a portion of the support free. In a preferred embodiment the protective layer(s) cover, at least in part, the portion of the support left free by the phosphor layer. An advantage of such a construction resides in the fact that the edges of the phosphor layer do not touch mechanical parts of the apparatus and are thus less easily damaged during use of the panel, more particularly e.g. during transport in the scanner. Another advantage of this construction is that no special edge reinforcement is necessary (although, if desired, further edge reinforcement can be applied). Although a construction of a phosphor panel wherein the surface of the phosphor layer is smaller than the surface of the support, so that the phosphor layer does not reach the edges of the support, represents a specific embodiment of the present invention, such a construction can be beneficial for the manufacture of any phosphor panel covered with any protective layer known in the art.

The invention moreover encompasses a method for the preparation of a phosphor panel comprising the steps of:
- providing a support (of amorphous carbon, whereupon an aluminum mirror layer has been deposited),
- chemical vapour depositing a parylene layer on said support (=on said aluminum layer),
- applying a phosphor layer on said support,
- chemical vapour depositing another parylene layer, this time on said phosphor layer, and, optionally,
- applying an outermost protective layer most remote from the support.

The present invention moreover includes a method for the preparation of a binderless phosphor panel comprising the steps of
- providing a support (of amorphous carbon, whereupon an aluminum mirror layer has been deposited),
- chemical vapour depositing a parylene layer on said support (=upon said aluminum layer),
- vapour depositing a CsX:Eu phosphor, wherein X represents a halide selected from the group consisting of Br and Cl, forming thereby a binderless phosphor layer on said support;
- optionally polishing the phosphor layer;
- chemical vapour depositing another parylene layer, this time upon said phosphor layer, and, optionally,
- applying an outermost protective layer most remote from the support, therefore
- applying a radiation curable solution on top of said parylene layer most remote from the support, and curing it by UV and/or electron beam (EB) exposure.

According to the present invention use of a screen or panel as disclosed before in a system for computed radiography has further been claimed. Use of a radiation image storage phosphor panel in an image forming method for storing and reproducing a radiation image thus comprises the steps of:
- exposing said radiation image storage panel with radiation energy having passed through an object or having been emitted by said object and storing said radiation energy in form of a latent image on said image storage panel;
- releasing the stored energy in form of light upon irradiation with stimulating rays of the visible or infrared region, thereby emitting light from the ultraviolet or visible wavelength region
- collecting said light released from the storage panel by light-collecting means and converting the collected light into a series of electric signals;
- producing an image corresponding to the latent image from the electric signals.

More particularly use of a screen or panel according to the present invention in mammographic applications is claimed as those particular applications are extremely desiring high image quality, and, more particularly, sharpness.

While the present invention will hereinafter be described in connection with preferred embodiments thereof, it will be understood that it is not intended to limit the invention to those embodiments.

PARTS LIST 1. phosphor layer
2: 1–10 μm moisture-repellant or resistant (parylene) layer
3: 1 μm reflective mirror layer
4: 2 mm support layer
21 auxiliary layer, moisture barrier layer
22 auxiliary layer, specularly reflecting layer
23 amorphous carbon layer
24 auxiliary layer, polymeric layer

EXAMPLES

A. Preparation of the Vapour Deposited Screens:

CsBr:Eu screens were made via thermal vapour deposition of CsBr and EuOBr. To this aim, CsBr was mixed with EuOBr and was placed in a container in a vacuum deposition chamber. The phosphor was deposited on a substrate. During vapour deposition, the substrate was rotated.

Different screens were produced with differing substrates. Before the start of the evaporation, the chamber was evacuated to a pressure of $4.10^{-5}$ mbar.

A first screen (S-D) was made with an Al substrate. Because of its composition and surface roughness the Al substrate was dull and did not reflect in a mirrorlike way.

A second screen was made on an a-C substrate on which an Al mirror was applied by vapour deposition (S-M). The substrate had a clear mirrorlike reflection, because of the surface smoothness and because of the pureness of the aluminum.

For both screens the deposited CsBr:Eu layer had a thickness of about 160 μm.

C. Measurement of the Screen Sensitivity:

The screens were homogeneously irradiated at 30 keV and 5 mA for 10s.

Read out was done in a flying spot scanner. In the scanner, the scanning light source was a 30 mW diode laser emitting at 685 nm. A 4-mm BG-39® (trade name of Hoya) filter, covered with a dielectric coating was used to separate the stimulation light from the screen emission light. The scan-average levels (SAL's) were determined as the average signal produced by the screens in the photomultiplier tube of the flying-spot scanner.

D. Measurement of Resolution:

In a second measurement, the sharpness of the images, produced by the screens was measured. As a measure for the sharpness, the edge response was determined and used to calculate the modulation transfer function (MTF) as a function of spatial frequency.

A lead sheet was placed on top of the cassette, containing the screens. The lead sheet was imaged at 30 keV and 5 mA during 30". The screens were scanned with the flying spot scanner described above. The resulting profile was used to calculate the MTF as a function of spatial frequency.

The sensitivity of the screen with reflective substrate (S-M) relative to the sensitivity of the screen with dull Al substrate (S-D) was 170%.

Figure 2:
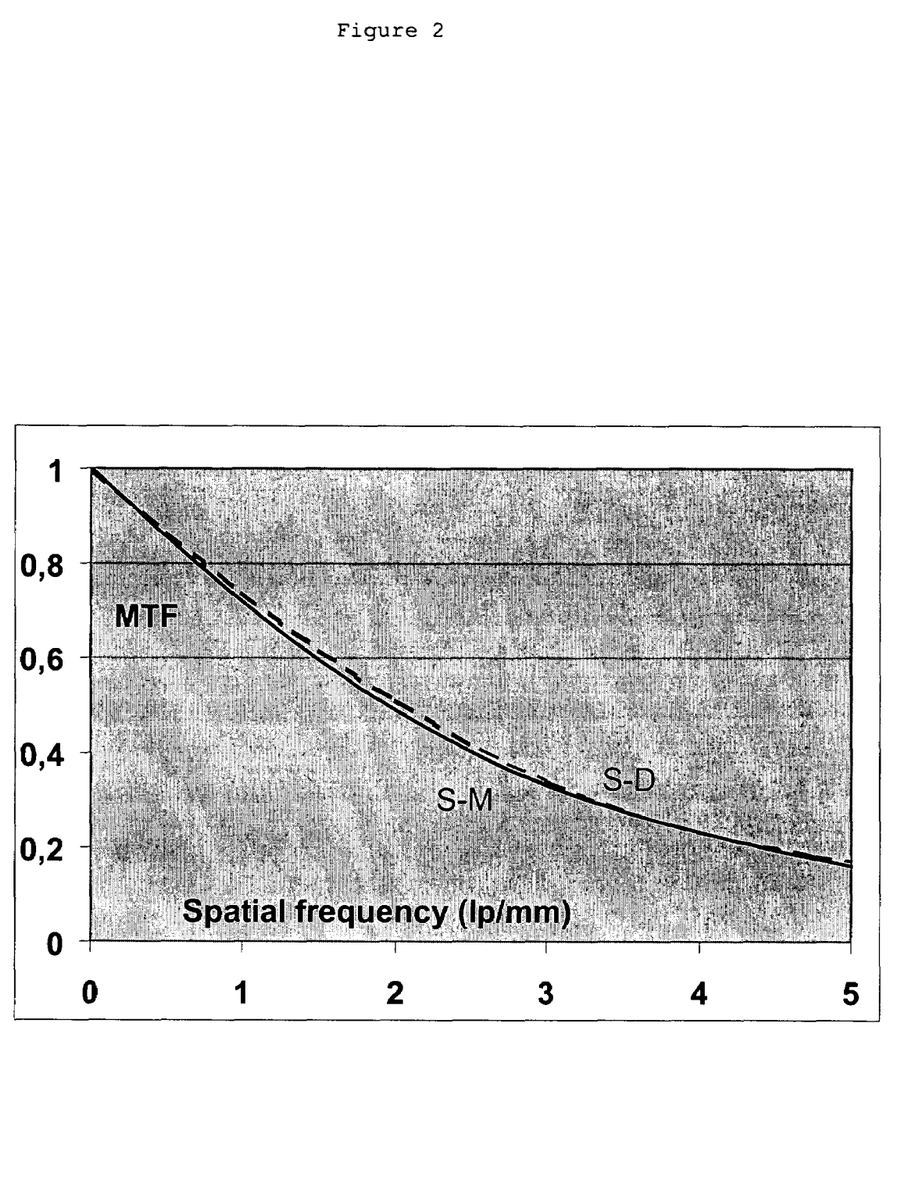
FIG. 2 shows the modulation transfer function (MTF) as a function of spatial frequency as a measure for the sharpness for a storage phosphor screen (inventive) with reflective substrate (S-M) versus a comparative screen with dull aluminum substrate (S-D).

FIG. 2 shows the MTF (Modulation Tranfer Function) obtained for both screens. It is clear that both screens lead to very comparable resolutions.

The same experiment was done for a powder screen: the powder phosphor layer was applied onto a black PET substrate and onto a white, reflecting PET substrate. For the powder screen as for the needle screen a significant increase in sensitivity was observed, but opposite to the observation for the needle screen, its resolution was strongly degraded and was inferior for the powder screen.

Having described in detail preferred embodiments of the current invention, it will now be apparent to those skilled in the art that numerous modifications can be made therein without departing from the scope of the invention as defined in the appending claims.

The invention claimed is:

1. Image storage screen or panel comprising a binderless needle-shaped stimulable phosphor and a substrate, characterized in that said substrate has a surface roughness of less than 2 μm and a reflectivity of more than 80% wherein a moisture-repellent layer is present inbetween said substrate and said phosphor layer.

2. Screen or panel according to claim 1, wherein said reflectivity is at least 90%.

3. Screen or panel according to claim 2, wherein said substrate has a surface roughness of less than 1 μm.

4. Screen or panel according to claim 3, wherein said phosphor is a CsX:Eu phosphor, wherein X, is selected from Br and Cl.

5. Screen or panel according to claim 4, wherein said substrate is an amorphous carbon layer, overcoated with a reflecting layer.

6. Screen or panel according to claim 5, wherein said reflecting layer is an aluminum layer.

7. Screen or panel according to claim 3, wherein said substrate is an amorphous carbon layer, overcoated with a reflecting layer.

8. Screen or panel according to claim 7, wherein said reflecting layer is an aluminum layer.

9. Screen or panel according to claim 2, wherein said phosphor is a CsX:Eu phosphor, wherein X is selected from Br and Cl.

10. Screen or panel according to claim 9, wherein said substrate is an amorphous carbon layer, overcoated with a reflecting layer.

11. Screen or panel according to claim 10, wherein said reflecting layer is an aluminum layer.

12. Screen or panel according to claim 2, wherein said substrate is an amorphous carbon layer, overcoated with a reflecting layer.

13. Screen or panel according to claim 12, wherein said reflecting layer is an aluminum layer.

14. Screen or panel according to claim 1, wherein said reflectivity is at least 95%.

15. Screen or panel according to claim 14, wherein said substrate has a surface roughness of less than 1 μm.

16. Screen or panel according to claim 15, wherein said phosphor is a CsX:Eu phosphor, wherein X is selected from Br and Cl.

17. Screen or panel according to claim 16, wherein said substrate is an amorphous carbon layer, overcoated with a reflecting layer.

18. Screen or panel according to claim 17, wherein said reflecting layer is an aluminum layer.

19. Screen or panel according to claim 15, wherein said substrate is an amorphous carbon layer, overcoated with a reflecting layer.

20. Screen or panel according to claim 19, wherein said reflecting layer is an aluminum layer.

21. Screen or panel according to claim 14, wherein said phosphor is a CsX:Eu phosphor, wherein X is selected from Br and Cl.

22. Screen or panel according to claim 21, wherein said substrate is an amorphous carbon layer, overcoated with a reflecting layer.

23. Screen or panel according to claim 22, wherein said reflecting layer is an aluminum layer.

24. Screen or panel according to claim 14, wherein said substrate is an amorphous carbon layer, overcoated with a reflecting layer.

25. Screen or panel according to claim 24, wherein said reflecting layer is an aluminum layer.

26. Screen or panel according to claim 1, wherein said substrate has a surface roughness of less than 1 μm.

27. Screen or panel according to claim 26, wherein said phosphor is a CsX:Eu phosphor, wherein X is selected from Br and Cl.

28. Screen or panel according to claim 27, wherein said substrate is an amorphous carbon layer, overcoated with a reflecting layer.

29. Screen or panel according to claim 28, wherein said reflecting layer is an aluminum layer.

30. Screen or panel according to claim 26, wherein said substrate is an amorphous carbon layer, overcoated with a reflecting layer.

31. Screen or panel according to claim 30, wherein said reflecting layer is an aluminum layer.

32. Screen or panel according to claim 26, wherein, adjacent to the said phosphor layer, a moisture-repellent layer is coated as an outermost layer.

33. Screen or panel according to claim 26, wherein said moisture-repellent layer is a parylene layer.

34. Screen or panel according to claim 1, wherein said phosphor is a CsX:Eu phosphor, wherein X is selected from Br and Cl.

35. Screen or panel according to claim 34, wherein said substrate is an amorphous carbon layer, overcoated with a reflecting layer.

36. Screen or panel according to claim 35, wherein said reflecting layer is an aluminum layer.

37. Screen or panel according to claim 34, wherein, adjacent to the said phosphor layer, a moisture-repellent layer is coated as an outermost layer.

38. Screen or panel according to claim 34, wherein said moisture-repellent layer is a parylene layer.

39. Screen or panel according to claim 1, wherein said substrate is an amorphous carbon layer, overcoated with a reflecting layer.

40. Screen or panel according to claim 39, wherein said reflecting layer is an aluminum layer.

41. Screen or panel according to claim 39, wherein, adjacent to the said phosphor layer, a moisturerepellent layer is coated as an outermost layer.

42. Screen or panel according to claim 39, wherein said moisture-repellent layer is a parylene layer.

43. Screen or panel according to claim 1, wherein, adjacent to the said phosphor layer, a moisture-repellent layer is coated as an outermost layer.

44. Screen or panel according to claim 1, wherein said moisture-repellent layer is a parylene layer.

45. A system for computed radiography comprising a screen or panel according to claim 1.

46. A mammographic system comprising a screen or panel according to claim 45.

* * * * *